Jan. 2, 1934.  A. VIGNE  1,941,768

BEARING

Filed Sept. 30, 1929

INVENTOR:
Albert Vigne,
BY
Hugh K. Wagner,
ATTORNEY.

Patented Jan. 2, 1934

1,941,768

UNITED STATES PATENT OFFICE 1,941,768

BEARING

Albert Vigne, St. Louis, Mo., assignor to National Bearing Metals Corporation, St. Louis, Mo., a corporation of New York Application September 30, 1929
Serial No. 396,131

4 Claims. (Cl. 308—239)

This invention relates to bearings generally, and in its more limited aspects to a bushing for lining the journal bearings of electric motors and other machinery wherein it is highly essential that the journal of a shaft be maintained as closely as possible to a position concentric with the bearing.

To this end, the primary purpose of the present invention is the provision of a bearing or bushing whose bearing-surface will not wear away eccentrically or unevenly; in which the wear will be materially reduced; and in which the tolerance or latitude of fit to allow for expansion and contraction in response to change in temperature will be reduced to a minimum.

Prior to the present invention, bearings of this character, and especially the bearings of street railway motors, were constructed either by lining them with bronze bushings, or by babbitting them with a high tin base alloy or an alloy that contains no lead. The bronze bearings are objectionable because they must be bored about eighteen or twenty one-thousandths of an inch oversize to allow for the contraction of the internal diameter of the bushing in response to temperature change. The babbitted bearings, however, need be bored only about three one-thousandths of an inch larger than the axle; but they are more expensive than the bronze bushed bearings and must be relined every sixty-thousand miles in railway service.

Accordingly, another purpose of the present invention is the provision of a bronze bearing which will give satisfactory service when bored with the same tolerance as a high tin base babbitt bearing.

A further object is the provision of a method of producing the bushing of the present invention.

Other objects, advantages and desirable features of the invention will appear in the course of the following description of an illustrative embodiment of the spirit thereof.

In the accompanying drawing forming part of this specification, in which like numbers of reference denote like parts wherever they occur.

Figure 1:
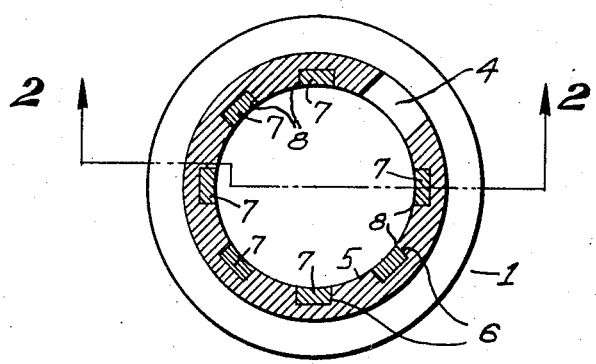
Figure 2:
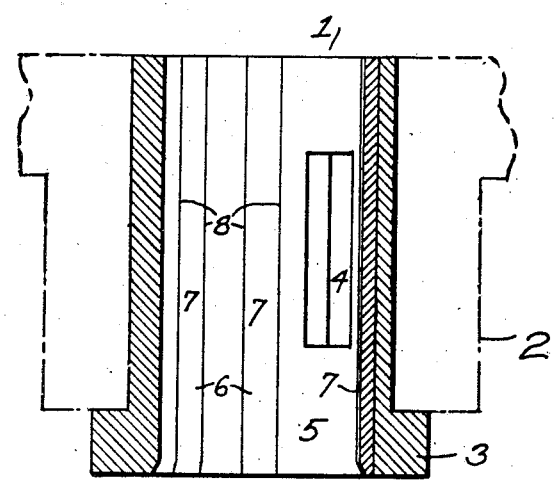

Figure 1 is a transverse sectional view of a bushing made in accordance with the present invention; and Figure 2 is a longitudinal sectional view taken on the line 2—2 in Figure 1.

The bushing 1 is formed in any suitable manner of a bronze of the usual or any suitable composition, such, for example, as Tiger bronze, which consists of seventy-seven per cent of copper, eight per cent of tin, and fifteen per cent of lead. Its external diameter is such that it fits tightly in the bore of the bearing 2 of an electric motor or other apparatus, and it may be provided with a flange 3 to limit its inward movement when it is being driven into the bearing 2. The bushing is apertured at 4 to conduct oil from the oil well of the bearing 2 into the interior of the bushing. The internal surface or bearing surface 5 of the bushing is provided with a series of grooves or interruptions 6 that extend from end to end of the bushing, preferably parallel to each other and to the axis of the bushing. The bushing may be produced by casting it into form and by boring, turning, and facing it, and cutting into it the grooves 6; or it may be formed by extruding, broaching, and other operations; or in any other suitable manner. When the bushing has been thus formed its internal surface 5 and the surfaces of the grooves 6 are coated with molten tin, any oxide and foreign matter, of course, having first been removed from these surfaces in any usual or suitable manner. The grooves 6 are then filled with a molten lead base babbitt 7, preferably one containing about eighty per cent of lead and about twenty per cent of antimony and copper. The babbitt 7 adheres to the tin coating and solidifies in the grooves 6. Of course, the bushing is provided with a suitable mold or mandrel that confines the babbitt to the grooves 6 when it is being poured. If desired, the bushing may be bored after filling the grooves 6, instead of before.

The construction of the bushing having been fully described, its mode of functioning will be readily understood. Assume, for the sake of illustration, that the bushings are employed to line the bearings of an electric railway motor, and that they are bored three one-thousandths of an inch larger than the diameter of the journals of the motor shaft. As the temperature of the bushing rises during operation, it tends to expand circumferentially throughout the thickness of the bushing. The bearing shells 2 of the motor frame, however, do not become as hot as the bushing, as they are exposed and, moreover, their expansion for a given rise of temperature is less than that of the bronze bushings, since they are usually formed of iron or steel. Consequently, the bearing shells 2 limit the expansion of the abutting outer cylindrical surface of the bushings. Expansion of the internal surface 5 of the bushing, however, is permitted by reason of its continuity being interrupted by the grooves 6, whose lead base babbitt fillings or inserts 7, being soft, yield to permit the adjacent longitudinal edges 8 of the surface 5 to approach one another and to diminish the width of the grooves 6, thereby extruding the fillings 7 against the journal of the shaft or axle, whereby the journal is supported on the protruded fillings 7 rather than on the bronze of the internal surface 5, thereby preventing wear on the bronze; and, as well, reducing the friction in the bearing, since the coefficient of friction of the journal on the lead base alloy is much less than the co-efficient of friction of the journal on the bronze. Moreover, if the temperature rises to about six hundred degrees Fahrenheit, the heated lead melts and oozes out and is carried around by the journal over the bronze surfaces, thereby acting, also, as a lubricant. When the friction is reduced, further heating and expansion of the internal surface of the bushing ceases, thereby preventing binding of the bushing on the journal. The bronze of the bushing, also, acts as a sponge for the tin coating and the lead alloy, which soaks into the surface of the bronze to a depth of about fifteen one-thousandths of an inch. When the bearing cools, the rotating shaft forces the fillings 7 back into the grooves 6. It is found in practice that the bushing of the present invention will serve for one hundred fifty thousand miles in railway service without renewal, in contrast to the sixty thousand miles afforded by babbitted bearings. Moreover, the tolerance and looseness of the journal in the bearing is no greater than that in babbitted bearings; and besides, eccentric wear of the bearings is materially reduced. This is a matter of great importance in the bearings of electric motors, on account of the desirability of maintaining uniformity of the air gap between the armature and the poles of the motor.

Having thus fully described this invention, I hereby reserve the benefit of all changes in form, arrangement, order or use of parts, as it is evident that many minor changes may be made therein without departing from the spirit of this invention or the scope of the following claims:

I claim:

1. An annularly continuous journal-bearing of comparatively hard metal and provided with groove means in its internal journal-engaging surface, the opposing edges of said groove means being free throughout their length to approach and recede from one another in response to local change in temperature independently of the general expansion and contraction of the entire bearing, and metal softer than the body of the bearing filling said groove means flush with the said internal surface of the bearing.

2. An annularly endless journal-bearing of comparatively hard metal and provided with a series of longitudinal grooves in its internal annular surface and extending from end to end of the bearing, and metallic material softer than the body of the bearing filling said grooves so as to provide a composite journal-engaging surface comprising alternate portions of the material of said body and of said softer metallic material, said softer metallic material being adapted to protrude from the composite surface as the temperature is raised, and to retract thereinto as the temperature is lowered.

3. An annularly endless journal bearing of relatively hard metal having an annular series of grooves in its internal surface that extend from end to end of the bearing, a coating melted into the surfaces of the grooves, and inserts of a relatively soft metal molded into the grooves, and anchored therein upon the surface of said coating, said inserts alternating with the material intermediate said grooves to form a composite journal engaging surface and protruding and retracting relatively to the hard metal components of said surface in response to local change in temperature.

4. An annularly endless journal-bearing of comparatively hard metal and provided with groove means in its internal journal-engaging surface, the opposing edges of said groove means being free throughout their length to approach and recede from one another in response to local change in temperature independently of the general expansion and contraction of the entire bearing, a coating melted into the surfaces of the groove means, and relatively soft metal molded into the groove means and anchored therein upon the surface of the said coating, said soft metal alternating with the material intermediate said groove means to form a composite journal-engaging surface and protruding and retracting relatively to the hard metal components of said surface in response to local change in temperature.

ALBERT VIGNE.